United States Patent
Hagen et al.

(10) Patent No.: US 9,876,755 B2
(45) Date of Patent: Jan. 23, 2018

(54) IDENTIFYING ALGORITHMICALLY GENERATED DOMAINS

(71) Applicant: Hewlett-Packard Development Company, L.P., Houston, TX (US)

(72) Inventors: Josiah Hagen, Austin, TX (US); Brandon Niemczyk, Austin, TX (US); Richard Lawshae, Austin, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 299 days.

(21) Appl. No.: 14/723,102

(22) Filed: May 27, 2015

(65) Prior Publication Data

US 2016/0352679 A1    Dec. 1, 2016

(51) Int. Cl.
H04L 29/12 (2006.01)
H04L 29/06 (2006.01)

(52) U.S. Cl.
CPC ...... *H04L 61/1511* (2013.01); *H04L 63/1416* (2013.01); *H04L 63/145* (2013.01); *H04L 2463/144* (2013.01)

(58) Field of Classification Search
CPC ........... H04L 61/1511; H04L 2463/144; H04L 61/6004; H04L 63/1416; H04L 63/145
USPC ........................................................ 709/245
See application file for complete search history.

(56) References Cited

U.S. PATENT DOCUMENTS

| 8,260,914 B1* | 9/2012 | Ranjan | H04L 61/1511 709/224 |
| 2011/0167493 A1* | 7/2011 | Song | H04L 63/1416 726/23 |
| 2011/0258237 A1* | 10/2011 | Thomas | G06F 17/30887 707/803 |
| 2013/0191915 A1* | 7/2013 | Antonakakis | H04L 63/14 726/23 |

OTHER PUBLICATIONS

Ranjan et al. "Detecting Algorithmically Generated Malicious Domain Names", IMC'10, Nov. 1-3, 2010, Melbourne, Australia. 14 pages.*

Davuth, N. et al., "Classification of Malicious Domain Names Using Support Vector Machine and Bi-gram Method," (Research Paper), Jan. 2013, 8 pages.

(Continued)

*Primary Examiner* — Michael C Lai
(74) *Attorney, Agent, or Firm* — Hewlett Packard Enterprise Patent Department

(57) ABSTRACT

Examples relate to identifying algorithmically generated domains. In one example, a computing device may: receive a query domain name; provide the query domain name as input to a predictive model that has been trained to determine whether the query domain name is an algorithmically generated domain name, the determination being based on syntactic features of the query domain name, the syntactic features including a count of particular character n-grams included in at least a portion of the query domain name, where n is a positive integer greater than one; and receive, as output from the predictive model, data indicating whether the query domain name is algorithmically generated.

15 Claims, 3 Drawing Sheets

(56) References Cited

OTHER PUBLICATIONS

Kuhrer, M. et al., "Paint It Black: Evaluating the Effectiveness of Malware Blacklists," (Research Paper), Jun. 25, 2014, 28 pages.
Schavoni, S. et al., "Tracking and Characterizing Botnets Using Automatically Generated Domains," (Research Paper), Nov. 21, 2013, 14 pages.
Stalmans, E.R. et al., "DNS Traffic Based Classifiers for the Automatic Classification of Botnet Domains," (Research Paper), Jun. 2013, 134 pages.

* cited by examiner

IDENTIFYING ALGORITHMICALLY GENERATED DOMAINS

BACKGROUND

Computer networks and the devices that operate on them often experience problems for a variety of reasons, e.g., due to misconfiguration, software bugs, and malicious network and computing device attacks. Detecting and preventing the use and spreading of malicious software, for example, is often a priority for computer network administrators. Malicious software is increasingly designed to avoid detection using relatively sophisticated methods.

BRIEF DESCRIPTION OF THE DRAWINGS

The following detailed description references the drawings, wherein.

DETAILED DESCRIPTION

Figure 1:
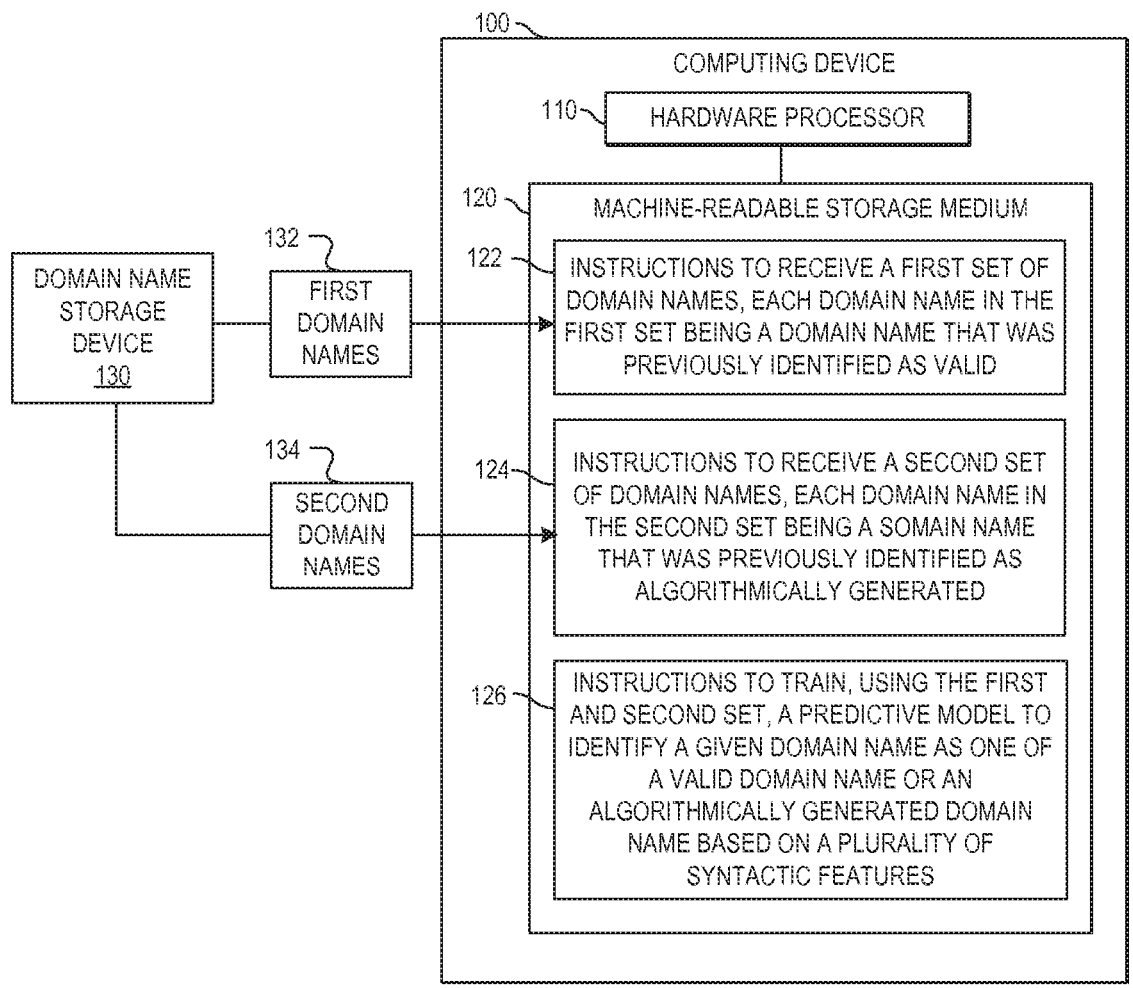
FIG. 1 is a block diagram of an example computing device for training a model to identify algorithmically generated domains.

Domain name generation algorithms (DGAs) may be implemented to produce random, or pseudo-random, domain names, e.g., often for temporary use by both legitimate and malicious entities. For example, a content delivery network may use algorithmically generated domains to provide various types of content, and malicious software ("malware") may use algorithmically generated domains to avoid detection. Among other uses, the ability to identify when a domain name is algorithmically generated, and to identify which domain name generation algorithm is used, may facilitate the detection and prevention of malware infections.

Domain name system (DNS) queries are a type of network traffic generally produced by a computing device operating on a computer network; the DNS queries include data specifying a domain name and are addressed to a DNS server device for domain name resolution. The DNS server typically provides an IP address associated with the query domain name in response to the DNS query, e.g., a computing device that issues a DNS query for "www.example.com," may be provided with a response, from a DNS server, indicating the IP address associated with the "www.example.com," e.g., "123.456.789.012." While DNS queries may be produced by computing devices for many non-malicious purposes, some malware may use DNS queries for malicious purposes.

As noted above, malware may make use of a DGA to periodically generate domain names to avoid detection, e.g., randomly generated domains can be used by malware command and control servers to provide infected computing devices with updates and/or commands. Malware makes use of DGAs, as opposed to static domains, to prevent the malware command and control servers from being blacklisted. An infected computing device may periodically attempt to reach out to a large number of randomly generated domain names, only a portion of which are registered to malware command and control servers. A network administrator's ability to detect a computing device that is using a DGA to generate a large number of randomly generated domain names may facilitate the identification of infected computing devices on the administrator's network. In addition, detecting the use of a DGA while network packets are in transit may allow administrators to block malicious, or potentially malicious, traffic.

In particular, a domain name analysis device may inspect DNS query packets sent from a client computing device. Each query domain name may be provided to a trained predictive model that has been trained to determine whether a domain name is algorithmically generated and, in some implementations, to identify the DGA used to generate the domain name. The predictive model may be trained to identify DGA use based on a variety of domain name features, such as a count of particular bigrams, a binary feature set indicating character positioning, and number and type of syntax violations, to name a few. When the use of a DGA is detected, the domain name analysis device may take action designed to ensure that appropriate remedial measures are taken with respect to the client computing device that produced the algorithmically generated domain, e.g., by notifying a network administrator, an entity that manages the client computing device, or another party or device responsible for handling potential security threats. Further details regarding the training and use of the predictive model for identifying algorithmically generated domains is described in further detail in the paragraphs that follow.

Referring now to the drawings, FIG. 1 is a block diagram of an example computing device 100 for training a model to identify algorithmically generated domains. Computing device 100 may be, for example, a server computer, a personal computer, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-126, to control the process for training a model to identify algorithmically generated domains. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-126, for training a model to identify algorithmically generated domains.

A domain name storage device 130 is in communication with the computing device 100 to provide the computing device 100 with domain names, e.g., domain names 132 and 134. The domain name storage device 130 may be any computing device, such as one similar to the computing device 100, and may include or have access to any number of storage mediums, similar to machine-readable storage medium 120. While the implementation depicted in FIG. 1 shows the domain name storage device 130 as the only source of domain names, the computing device 100 may receive domain names from a variety of sources.

As shown in FIG. 1 the computing device 100 executes instructions (122) to receive a first set of domain names 132, and each domain name in the first set is a domain name that was previously identified as valid. For example, a list of the most popular and/or most visited websites, and/or websites included on a whitelist of websites known to be non-malicious, may be used to identify valid domains included in the first set of domain names 132.

The computing device 100 executes instructions (124) to receive a second set of domain names 134, and each domain name in the second set is a domain name that was previously identified as algorithmically generated. For example, a list of algorithmically generated domains known to be used by various types of malware may be obtained, e.g., from various anti-malware organizations. In some implementations, known DGAs may be used to generate domain names to be included in the second set of domain names 134.

The computing device 100 executes instructions (126) to train, using the first and second set, a predictive model to identify a given domain name as a valid domain name or an algorithmically generated domain name based on syntactic features. The syntactic features include a count of particular n-grams included in at least a portion of the query domain name, where n is a positive integer greater than one. For example, the number of non-English bigrams, e.g., occurrences of character pairs that do not exist in English words, in a second level domain may be a syntactic feature used to train the predictive model. While, in some implementations, syntactic features of whole domains, e.g., "www.example.com," may be used to train the predictive model, in some implementations portions of a domain may be used, such as the prefix, e.g., "www," the second level domain, e.g., "example," and/or the top level domain, e.g., "com."

A variety of syntactic features may be used to train the predictive model. For example, syntactic features of a domain name used to train the predictive model may include one or more of the following: the top level domain, a binary vector of languages associated with the top level domain, the a binary vector indicating the length of the second level domain, a scalar length of the second level domain, a binary vector of the length of the prefix, a scalar length of the prefix, a vector indicating a count of each of the "A-F" characters in the second level domain, a vector indicating a count of each of the "G-Z" characters in the second level domain, a vector indicating a count of each of the "a-f" characters in the second level domain, a vector indicating a count of each of the "g-z" characters in the second level domain, a count of English consonants in the second level domain, a count of English vowels in the second level domain, a count of "0-9" digit characters in the second level domain, a count of capital foreign letter characters in the second level domain, a count of lower case foreign letter characters in the second level domain, a count of dots, dashes, and underscores in the second level domain, a count of other printable ISO-8859-1 characters in the second level domain, a count of non-printable ISO-8859-1 characters in the second level domain, a vector indicating a count of each ISO-8859-1 character, a count of each valid character pair (2-gram) in the second level domain, a count of each valid character triple (3-gram) in the second level domain, a binary feature vector for the prefix and second level domain by position—where each binary value of the feature vector corresponds to a character and character position, a Boolean feature indicating instances of puny encoding, a Boolean vector of RFC 1034 syntax violations, and/or a count of English words in a domain name. As noted above, other syntactic features, including combinations of syntactic features and variations of the foregoing features, may be used to train the predictive model.

The type of predictive model trained may vary. Example predictive models may include linear classifiers, decision trees, support vector machines, and nearest neighbor classifiers, to name a few. The predictive model may be trained to accept all or a portion of a domain name as input and produce, as output, an indication of whether a domain name is algorithmically generated and, in some implementations, which DGA was used to generate the domain name.

In some implementations, the computing device 100 receives a query domain name, provides the query domain name to the predictive model as input, and receives, as output from the predictive model, a prediction specifying that the query domain name is either i) a valid domain name, or ii) an algorithmically generated domain name. For example, the query domain name may be extracted from a DNS query packet received by the computing device 100. Data indicating whether the query domain name was determined by the predictive model to be algorithmically generated may, in some implementations, be provided to a third party computing device, e.g., an administrator computing device, a client computing device, and/or a network security pipeline for handling potential security threats.

In some implementations, the computing device 100 receives a third set of domain names, and each domain name in the third set is a domain name that was previously identified as being generated by a particular DGA. For example, the particular DGA may be used to generate the domain names of the third set, which may then be provided to the computing device 100. Using the third set, a second predictive model may be trained to determine whether a particular domain name was generated by the particular DGA, and the determination may again be based on at least one of the syntactic features. In this situation, the computing device 100 may be able to identify use of the particular DGA, in addition to being able to generally detect DGA use.

The predictive model or models may be trained to produce a variety of types of output. In some implementations, a single predictive model may be trained to produce, as output, one of a plurality of DGAs used to produce the domain name provided as input, e.g., without first making a separate determination that the domain name is algorithmically generated. In some implementations, separate predictive models may be trained for each DGA, and domain names received by the computing device 100 may be provided to each predictive model until a positive identification of particular DGA use is determined. In some implementations, one or more predictive models may be trained to provide, as output, a measure of confidence that the domain name provided as input is algorithmically generated and/or a measure of confidence that the domain name provided as input was generated by a particular domain name. For example, a predictive model may be trained to provide, as output, a list of DGAs and, for each DGA, a measure of likelihood that the domain name provided as input was generated by the DGA. Further examples and details regarding the identification of algorithmically generated domains is provided in the paragraphs that follow.

Figure 2:
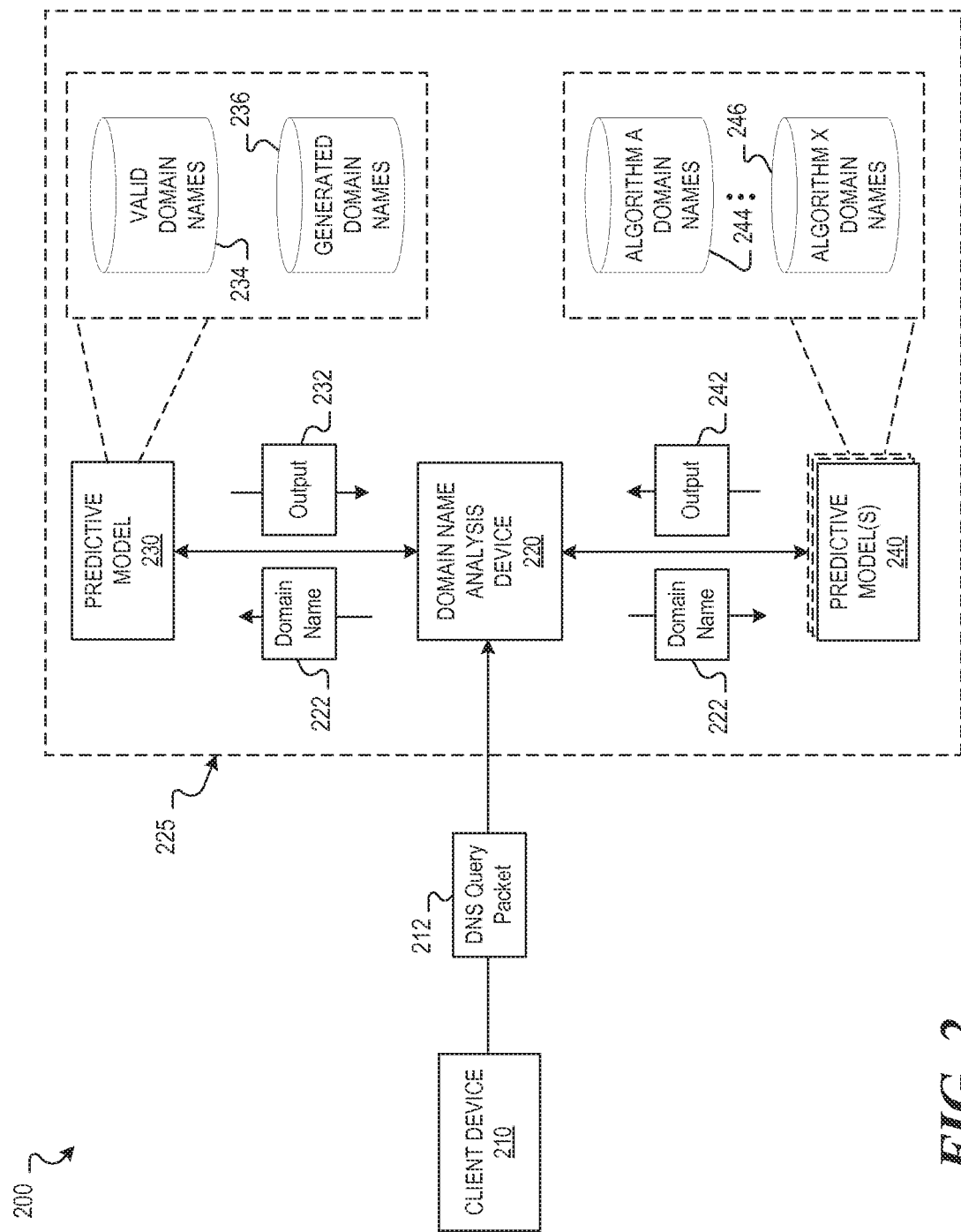
FIG. 2 is an example data flow for identifying algorithmically generated domains.

FIG. 2 is an example data flow 200 for identifying algorithmically generated domains. The data flow 200 depicts a domain name analysis device 220, which may be implemented by a computing device, such as the computing device 100 described above with respect to FIG. 1. The client device 210 may be any computing device suitable for network communications, such as a personal computer, mobile computer, virtual machine, server computer, or any combination thereof. For example, the client device 210 may be a virtual machine operating within a private cloud computing environment that uses the domain name analysis device 220 to provide security for the private cloud network.

During its operation, the client device 210 may periodically communicate using various network communications protocols. DNS queries are one form of network communications that may originate from the client device 210, e.g., in the form of a DNS query packet 212. Each DNS query packet 212 is addressed to a DNS server which will perform domain name resolution on a particular domain name. For example, in a situation where the client device 210 implements an e-mail application, a DNS query packet may be issued to identify the destination for an email addressed to "user@example.com."

DNS query packets, such as the DNS query packet 212, may be routed through or otherwise provided to the domain name analysis device 220. The domain name analysis device 220 extracts the domain name 222 from the DNS query packet 212 and provides the domain name 222 to a predictive model 230. In the example data flow 200, the predictive model 230 has been trained to determine whether domain names are algorithmically generated using syntactic features of valid—e.g., non-algorithmically generated—domain names 234 and algorithmically generated domain names 236. As discussed above, the syntactic features used to train the predictive model 230 may vary, and may include a count of particular character n-grams, such as impossible English bigrams and/or trigrams, included in at least a portion of the query domain name, where n>1. Impossible English bigrams may, by way of example, include the following bigrams, which do not occur within a single English word: bk, bg, bx, cb, cf, cg, cj, cp, cv, cw, cx, dx, fk, fq, fv, fx, fz, gq, gv, gx, hk, hv, hx, hz, iy, jc, jd, jf, jg, jh, jk, jl, jm, jn, jp, jg, jr, js, jt, jv, jw, jx, jy, jz, kg, kv, kx, kz, lq, lx, mg, mj, mq, mx, mz, pv, px, qb, qc, qd, qe, qf, qg, qh, qj, qk, ql, qm, qn, qo, qp, qr, qs, qt, qv, qw, qx, qy, qz, sx, sz, tg, tx, vb, vc, vd, vf, vg, vh, vj, vk, vm, vn, vp, vq, vt, vw, vx, vz, wq, wx, wz, xb, xg, xj, xk, xv, xz, yq, yv, yz, zb, zc, zg, zh, zj, zn, zq, zr, zs, zx. The predictive model 230, in response to receiving the domain name 222 as input, provides output 232 to the domain name analysis device 220, the output 232 indicating whether the domain name 222 was algorithmically generated.

In the example data flow 200, the domain name analysis device 220 provides the domain name 222 to one or more additional predictive model(s) 240. In some implementations, each other predictive model 240 may be separately trained to identify a particular DGA used to generate the domain name 222. For example, each of the predictive model(s) 240 may be trained using domain names previously known to have been generated by a particular DGA, e.g., Algorithm A domain names 244 may be used to train one of the predictive models 240 to determine whether a domain name was generated using Algorithm A, while Algorithm X domain names 246 may be used to train a different predictive model to determine whether a domain name was generated using Algorithm X. Providing the domain name to the additional predictive model(s) 240 may, in some implementations, be performed in response to the output 232 from the first predictive model 230 indicating the domain name 222 is algorithmically generated. The output 242 provided by any of the predictive model(s) 240 may indicate whether the query main name 222 was generated by the DGA used to train that predictive model.

In some implementations, the predictive model(s) 240 are a single predictive model trained to determine which DGA, of multiple DGAs, were used to generate the query domain name 222. For example, a predictive model 240 may be trained to determine, based on syntactic features of the domain name 222, which DGA was most likely used to generate the domain name 222 and provide data indicating that DGA as output 242. In implementations where measures of confidence are used to indicate the likelihood that a domain name is algorithmically generated and/or to indicate the likelihood that a domain name was generated by a particular DGA, the predictive model(s) 240 may produce output indicating the measure(s) of likelihood associated with each DGA. For example, if a single predictive model 240 is trained to determine the likelihood that the domain name 222 belongs to one of 10 DGAs or an unknown DGA, the predictive model 240 may provide, as output, a ranked list of the most likely DGAs used to generate the domain name 222 with a measure of confidence for each DGA in the list, including a measure of confidence for an unknown DGA, if applicable.

While the example data flow 200 depicts multiple predictive models being used to determine whether a DGA was used to generate the domain name 222 and to determine which particular DGA was used, in some implementations a single predictive model may be trained to identify which particular DGA is used, implicitly determining that a DGA was used. For example, a single predictive model may be trained using multiple sets of data, e.g., a set of domain names known to be valid/non-algorithmically generated, and multiple other sets of domain names that each include domain names algorithmically generated by a particular DGA. Accordingly, the single predictive model may, for example, provide output indicating that a given domain name is either valid or generated by a particular DGA.

The predictive model 230 and other predictive model(s) 240, while depicted separately from the domain name analysis device 220 in the example data flow 200, may be included in a single device 225, such as a single intermediary network device or server computer. For example, the single device 225, may be the domain name analysis device, which includes the predictive model 230 and other predictive model(s) 240. The predictive models may, in some implementations, be implemented in separate computing devices, e.g., each model may be implemented by a separate computing device, each in communication with the domain name analysis device 220. In some implementations, the predictive model 230 and/or other predictive models 240 may be trained by the same device or by separate devices. For example, predictive models may be separately trained by one or more computing devices and provided to a single network intrusion prevention device, such as device 225, for performing the identification of algorithmically generated domain names using the predictive models.

While only a single client device 210 is depicted in the example data flow 200, multiple client devices may provide DNS query packets to the domain name analysis device 220, and the client device 210 may provide more than one DNS query packet. In response to identifying an algorithmically generated domain, the domain name analysis device 220 may take a variety of actions. For example, the domain name analysis device 220 may log occurrences of algorithmically generated domains and/or provide data indicating the domain, identified DGA, and/or client device identifying information to another entity, such as a security event manager, network administrator computing device(s), the client device 210, and/or an entity that manages the client device 210. In addition, a domain name analysis device 220 implemented in an intermediary network device, such as an intrusion prevention system, may block the DNS query packets that include an algorithmically generated domain and/or block further traffic from the client device that provided the DNS query packet.

Figure 3:
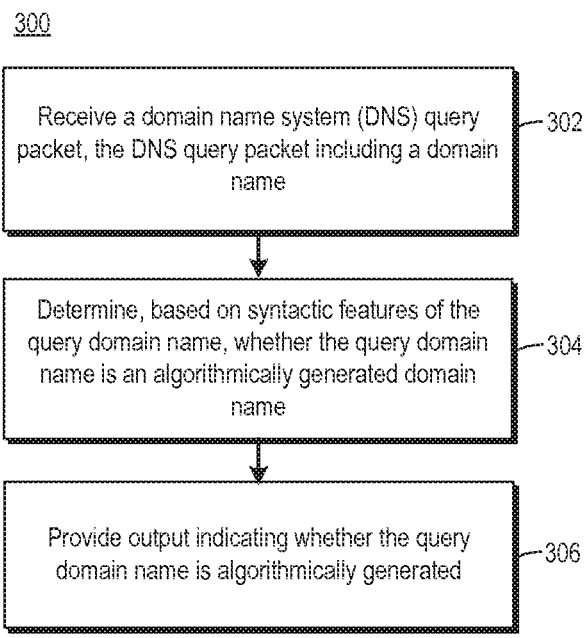
FIG. 3 is a flowchart of an example method for identifying algorithmically generated domains.

FIG. 3 is a flowchart of an example method 300 for identifying algorithmically generated domains. The method may be implemented by a computing device, such as computing device 100 described above with reference to FIG. 1. The method may also be implemented by the circuitry of a programmable hardware processor, such as a field-programmable gate array (FPGA) and/or an application-specific integrated circuit (ASIC). Combinations of one or more of the foregoing processors may also be used to identify algorithmically generated domains.

A DNS query packet that includes a domain name is received (302). For example, an intermediary network device may capture DNS query packets as they flow through a network. A hardware processor, such as an FPGA, may be configured to extract domain names from each DNS query packet that flows through the intermediary network device.

The hardware processor determines, based on syntactic features of the query domain name, whether the query domain name is an algorithmically generated domain name (304). The syntactic features include a count of particular character n-grams included in at least a portion of the query domain name, where n is a positive integer greater than one. In implementations where a programmable hardware processor is used, the syntactic features used to determine whether a domain name is algorithmically generated may depend upon the configuration of the programmable hardware processor, e.g., impossible English bigrams may be hardcoded into a particular FPGA configuration along with any other syntactic features used to identify algorithmically generated domains, e.g., using regular expressions to match syntactic features of the query domain name that are indicative of DGA use. Updating or otherwise changing the configuration may result in different features being used to identify algorithmically generated domains.

In some implementations, determining whether the query domain name is algorithmically generated includes determining which DGA was used to generate the query domain name. In implementations where a programmable hardware processor is used, for example, the programmable logic of a particular processor configuration may define which syntactic features correspond to which DGAs.

In some implementations, multiple hardware processors may be used to determine whether a domain name is algorithmically generated and/or determine which DGA was used to generate the domain name. For example, multiple FPGAs may be used, each with a different configuration, e.g., DGAs may each be associated with a particular FPGA that is configured to identify the use of the associated DGA based on syntactic features that may be different for the different DGAs. One set of syntactic features used to determine if a particular DGA was used may be different from a second set of syntactic features used to determine if another DGA was used. A variety of processors, programmable or otherwise, and a variety of syntactic features, may be used to determine whether a given domain name is algorithmically generated and/or which DGA was used to generate the given domain name.

In some implementations, the determination of whether the query domain name is algorithmically generated is based on output received from a predictive model. For example, as described in FIGS. 1-2 above, a predictive model may be trained to determine whether a DGA was used to generate a particular domain and, in some implementations, to determine which DGA was used. In implementations where one or more predictive models are used to determine DGA use, the predictive models may be implemented in computing devices, programmable hardware processors, and/or a combination thereof.

The hardware processor provides output indicating whether the query domain name is algorithmically generated (306). In implementations where the hardware processor determines which DGA was used, the output indicates which DGA was used. As noted above, multiple processors may be used to process each domain name, and in these situations each processor may provide output, e.g., indicating whether a particular DGA was used to generate the processed domain name. In situations where multiple processors are used, domain names may be processed serially, or in parallel, and the output of each processor may, in some implementations, include a measure of likelihood that the domain name was generated using the DGA associated with the processor.

In some implementations, the output may be used in a variety of ways. For example, the output may be logged for later analysis by the hardware processor and/or another entity or device. The DNS query packet that includes an algorithmically generated domain may be blocked, and further network communications from the source client device may be blocked e.g., in situations where the hardware processor is implemented in an in-line network intrusion prevention device. The output may also be provided to another entity, device, or process, such as a security event manager, administrative client device, the client device that provided the DNS query, and/or an entity that manages the client device.

The foregoing disclosure describes a number of example implementations for identifying algorithmically generated domains. As detailed above, examples provide a mechanism for identifying DGA use based on syntactic features of domain names and potential applications of a system that is capable of identifying algorithmically generated domains.

We claim:

1. A non-transitory machine-readable storage medium encoded with instructions executable by a processor to:
   receive a first set of domain names, each domain name in the first set being a domain name that was previously identified as valid;
   receive a second set of domain names, each domain name in the second set being a domain name that was previously identified as algorithmically generated; and
   train, using the first set and the second set, a predictive model to identify a given domain name as one of a valid domain name or an algorithmically generated domain name based on a plurality of syntactic features of the given domain name, wherein the plurality of syntactic features include a count of impossible character n-grams included in at least a portion of the given domain name, where n is a positive integer greater than one.

2. The storage medium of claim 1, further comprising instructions executable by the processor to:
   receive a query domain name;
   provide the query domain name to the predictive model as input; and receive, as output from the predictive model, a prediction specifying that the query domain name is one of a valid domain name or an algorithmically generated domain name.

3. The storage medium of claim 2, wherein the instructions executable to specify that the query domain name is an algorithmically generated domain name further comprise instructions executable by the processor to provide a third party computing device with data indicating that the query domain name is algorithmically generated.

4. The storage medium of claim 2, wherein the instructions executable to receive a query domain name include instructions to:
 receive a DNS query packet; and
 extract, from the DNS query packet, the query domain name.

5. The storage medium of claim 1, wherein:
 each domain name in the second set was previously identified as being generated by one of a plurality of domain name generation algorithms; and
 the instructions executable to identify the given domain name as an algorithmically generated domain name include instructions executable to identify the given domain name as being generated by one of the plurality of domain name generation algorithms.

6. The storage medium of claim 1, further comprising instructions executable by the processor to:
 obtain a third set of domain names, wherein each domain name in the third set is a domain name that was previously identified as being generated by a particular domain name generation algorithm; and
 train, using the third set, a second predictive model to determine whether a particular domain name was generated by the particular domain name generation algorithm, wherein the determination is based on at least one of the plurality of syntactic features of the particular domain name.

7. A computing device comprising:
 a processor; and
 a data storage device storing instructions executable by the processor, cause the processor to:
  receive a query domain name;
  provide the query domain name as input to a predictive model that has been trained to determine whether the query domain name is an algorithmically generated domain name, wherein:
   the determination is based on syntactic features of the query domain name; and
   the syntactic features include a count of impossible character n-grams included in at least a portion of the query domain name, where n is a positive integer greater than one; and
  receive, as output from the predictive model, data indicating whether the query domain name is algorithmically generated.

8. The computing device of claim 7, further comprising instructions executable by the processor to:
 provide the query domain name as input to a second predictive model that has been trained to determine whether the query domain name was generated by a particular domain name generation algorithm, wherein the determination is based on at least one of the syntactic features of the query domain name; and
 receive, as output from the second predictive model, data indicating whether the query domain name was generated by the particular domain name generation algorithm.

9. The computing device of claim 7, wherein the data indicating whether the query domain name is algorithmically generated specifies that the query domain name was generated by a particular domain name generation algorithm.

10. The computing device of claim 7, further comprising instructions executable by the processor to:
 provide the query domain name as input to a second predictive model that has been trained to determine which domain name generation algorithm of a plurality of domain name generation algorithms was used to generate the query domain name, wherein the determination is based on at least one of the syntactic features of the query domain name; and
 receive, as output from the second predictive model, data indicating one of the plurality of domain name generation algorithms.

11. The computing device of claim 10, wherein the data indicating one of the plurality of domain name generation algorithms specifies, for each of at least one of the plurality of domain name generation algorithms, a measure of likelihood that the query domain name was generated by the domain name generation algorithm.

12. The computing device of claim 7, wherein the instructions executable to receive a query domain name include instructions to:
 receive a DNS query packet; and
 extract, from the DNS query packet, the query domain name.

13. The computing device of claim 7, wherein the data indicating whether the query domain name is algorithmically generated specifies a measure of likelihood that the domain name is algorithmically generated.

14. A method for identifying algorithmically generated domains, implemented by a processor, the method comprising:
 receiving, from a client device, a domain name system (DNS) query packet including a query domain name;
 determining whether the query domain name is an algorithmically generated domain name, wherein:
  the determination is based on syntactic features of the query domain name; and
  the syntactic features include a count of impossible character n-grams included in at least a portion of the query domain name, where n is a positive integer greater than one; and
 providing output indicating whether the query domain name is algorithmically generated.

15. The method of claim 14, wherein:
 determining whether the query domain name is an algorithmically generated domain name comprises determining which domain generation algorithm (DGA) of a plurality of DGAs was used to generate the query domain name, and
 the output indicates which of the plurality of DGAs was used to generate the query domain name.

* * * * *